United States Patent
Zalewski et al.

(10) Patent No.: US 10,356,366 B2
(45) Date of Patent: Jul. 16, 2019

(54) SYSTEM AND METHOD FOR TAKING CONTROL OF A SYSTEM DURING A COMMERCIAL BREAK

(75) Inventors: Gary M. Zalewski, Oakland, CA (US); Riley R. Russell, San Mateo, CA (US)

(73) Assignee: Sony Interactive Entertainment America LLC, San Mateo, CA (US)

( * ) Notice: Subject to any disclaimer, the term of this patent is extended or adjusted under 35 U.S.C. 154(b) by 541 days.

(21) Appl. No.: 11/756,508

(22) Filed: May 31, 2007

(65) Prior Publication Data

US 2008/0297669 A1    Dec. 4, 2008

(51) Int. Cl.
| | |
|---|---|
| H04N 7/10 | (2006.01) |
| H04N 7/025 | (2006.01) |
| H04N 7/16 | (2011.01) |
| H04N 21/44 | (2011.01) |
| H04N 21/458 | (2011.01) |
| H04N 21/462 | (2011.01) |
| H04N 21/478 | (2011.01) |
| H04N 21/81 | (2011.01) |
| H04L 29/06 | (2006.01) |

(52) U.S. Cl.
CPC ......... *H04N 7/163* (2013.01); *H04L 65/4076* (2013.01); *H04L 65/605* (2013.01); *H04N 21/44008* (2013.01); *H04N 21/44016* (2013.01); *H04N 21/458* (2013.01); *H04N 21/4622* (2013.01); *H04N 21/4781* (2013.01); *H04N 21/812* (2013.01)

(58) Field of Classification Search
CPC ................... H04N 21/44008; H04N 21/44016
USPC ..................................... 725/32, 34
See application file for complete search history.

(56) References Cited

U.S. PATENT DOCUMENTS

| | | | |
|---|---|---|---|
| 5,643,088 A | 7/1997 | Vaughn et al. | |
| 5,973,723 A * | 10/1999 | DeLuca | 725/34 |
| 6,512,551 B1 * | 1/2003 | Lund | 348/564 |
| 6,698,020 B1 * | 2/2004 | Zigmond et al. | 725/34 |
| 6,704,930 B1 * | 3/2004 | Eldering et al. | 725/36 |
| 6,769,128 B1 | 7/2004 | Knee et al. | |
| 6,804,825 B1 | 10/2004 | White et al. | |
| 6,942,574 B1 | 9/2005 | Lemay et al. | |
| 7,400,364 B2 * | 7/2008 | Chen et al. | 348/731 |

(Continued)

FOREIGN PATENT DOCUMENTS

| | | |
|---|---|---|
| EP | 1195184 | 4/2002 |
| JP | 7-75015 | 3/1995 |

(Continued)

OTHER PUBLICATIONS

International Search Report & Written Opinion dated Aug. 1, 2008 for Application No. PCT/US08/05915.

(Continued)

*Primary Examiner* — Jason P Salce
(74) *Attorney, Agent, or Firm* — Penilla IP, APC

(57) ABSTRACT

During output of a primary media stream from a cable, satellite, television, radio or internet source, a condition, signal or indication of a commercial break is detected causing a context switch to occur and enabling other services, programming or devices to intervene during the commercial break and causing an alternative output to be produced by a process or device. When the commercial break is over, the system may optionally rejoin with the primary media stream.

21 Claims, 6 Drawing Sheets

(56) References Cited

U.S. PATENT DOCUMENTS

| | | | |
|---|---|---|---|
| 7,895,625 B1* | 2/2011 | Bryan | H04N 5/782 725/46 |
| 8,402,503 B2* | 3/2013 | Malik | H04N 7/17318 725/135 |
| 2001/0042249 A1* | 11/2001 | Knepper et al. | 725/42 |
| 2002/0095674 A1 | 7/2002 | Lowthert et al. | |
| 2002/0144262 A1* | 10/2002 | Plotnick et al. | 725/32 |
| 2003/0063224 A1* | 4/2003 | Iwamoto et al. | 348/731 |
| 2003/0066077 A1* | 4/2003 | Gutta et al. | 725/34 |
| 2004/0189873 A1 | 9/2004 | Konig et al. | |
| 2004/0194130 A1* | 9/2004 | Konig et al. | 725/32 |
| 2004/0247139 A1* | 12/2004 | Wang | 381/74 |
| 2004/0255336 A1* | 12/2004 | Logan | H04H 20/28 725/135 |
| 2004/0261125 A1* | 12/2004 | Ellis | H04N 5/44543 725/133 |
| 2005/0026690 A1 | 2/2005 | Silver et al. | |
| 2006/0068861 A1 | 3/2006 | Triestram et al. | |
| 2007/0033633 A1* | 2/2007 | Andrews et al. | 725/135 |
| 2007/0115391 A1 | 5/2007 | Anderson | |
| 2008/0062336 A1* | 3/2008 | Dooms | 348/734 |
| 2008/0168500 A1* | 7/2008 | Carlson et al. | 725/46 |
| 2008/0320513 A1* | 12/2008 | Wong et al. | 725/38 |
| 2009/0141168 A1* | 6/2009 | Chen et al. | 348/465 |
| 2009/0222866 A1* | 9/2009 | Jenzowsky et al. | 725/93 |

FOREIGN PATENT DOCUMENTS

| | | |
|---|---|---|
| JP | 775015 | 3/1995 |
| JP | 2002010158 | 1/2002 |
| JP | 2003219307 | 7/2003 |
| JP | 2005094451 | 4/2005 |
| JP | 2006217523 | 8/2006 |
| JP | 2007-053566 | 3/2007 |
| JP | 2007053566 | 3/2007 |
| WO | 0133848 | 5/2001 |
| WO | WO-2007125128 | 11/2007 |

OTHER PUBLICATIONS

International Preliminary Report on Patentability dated Dec. 10, 2009 in related International Patent Application No. PCT/US2008/005915, 6 pages.

Non-Final Office Action for CHines Patent Application No. 200880018141.9 dated Mar. 16, 2011, 12 pages.

Non-final Office Action for Chinese Patent Application No. 200880018141.9 dated Mar. 12, 2012.

Final Office Action for Japanese Patent Application No. 2010-510282, dated Dec. 4, 2012.

Non-Final Office Action for Chinese Patent Application No. 200880018141.9, dated Dec. 13, 2012.

Final Office Action for Japanese Patent Application No. 2010-510282, dated May 8, 2012.

European Search Report and Written Opinion for European Patent Application No. 08754268.4, dated Apr. 5, 2013, 148 pages.

Non-Final Office Action for Chinese Patent Application No. 200880018141.9 dated Jul. 25, 2013, 20 pages.

Decision of Grant for Japanese Patent Application No. 2010-510282, dated Oct. 15, 2013. No English translation available.

Non-final Office Action for Chinese Patent Application No. 200880018141.9 dated Mar. 27, 2012.

Non-Final Office Action for Japanese Patent Application No. 2010-510282, dated May 8, 2012.

Sony Computer Entertainment, America, LLC , "Non-Final Office Action", Chinese Patent Application No. 200880018141.9, (dated Jul. 6, 2016).

Non-Final Office Action for Chinese Patent Application No. 200880018141.9 dated Apr. 19, 2016.

* cited by examiner

SYSTEM AND METHOD FOR TAKING CONTROL OF A SYSTEM DURING A COMMERCIAL BREAK

The invention generally relates to the fields of media and advertising. In particular, the invention relates to a system and method for taking control of a service or device during a commercial break whereby control and output is switched to provide alternative content during the television commercial break.

BACKGROUND

A wide variety of multimedia content is currently available to consumers. Digital content ranges from low-bandwidth, unidirectional data streams such as low-fidelity audio-only content, through high-bandwidth, bi-directional data streams that support interactive, real-time, virtual game environments.

Many consumer devices and services are available to generate, present, transform, store, replay and otherwise manipulate multimedia streams. Televisions, digital video recorders ("DVRs"), game consoles, cable television receivers, Video On Demand ("VOD") services and even cellular telephones are capable of providing rich media experiences for consumers.

Media distribution has long been supported by revenue from product advertisements and "commercial breaks." However, many consumers prefer to avoid commercials by switching to a different media channel during a commercial break, or by fast forwarding through commercials that appear in a recorded stream.

No system has been put forth that automatically, upon detection of a commercial break, will cause a context switch to enable other services, programming or devices to gain control of the output of a display, speaker, process or system during the period of the commercial break then rejoin with the original programming context when the commercial break is over.

SUMMARY

During playback of a primary media stream and on detection of a predetermined condition, signal or indication of a commercial break, a context switch occurs enabling other services, programming or devices to output a secondary stream to a display, speaker, process or system. The secondary stream may be processed during the period of the commercial break. When the commercial break is over, a change in the predetermined condition will optionally cause the system to rejoin with the original programming context.

BRIEF DESCRIPTION OF DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

DETAILED DESCRIPTION

Embodiments of the invention provide alternative media that a user may be subjected to during the period of a commercial break. The present invention may also allow a user to tailor a multimedia experience to suit her particular interests. Furthermore, the present invention may provide a means for controlling the advertising time slot in a commercial break and give control of it to the adopters of the present invention.

In one embodiment, the user can select desired and undesired features of various content streams, and a system of the present invention will automatically select material from among available streams to produce an aggregate stream that more closely approximates the user's ideal experience than any single stream alone.

Figure 1:
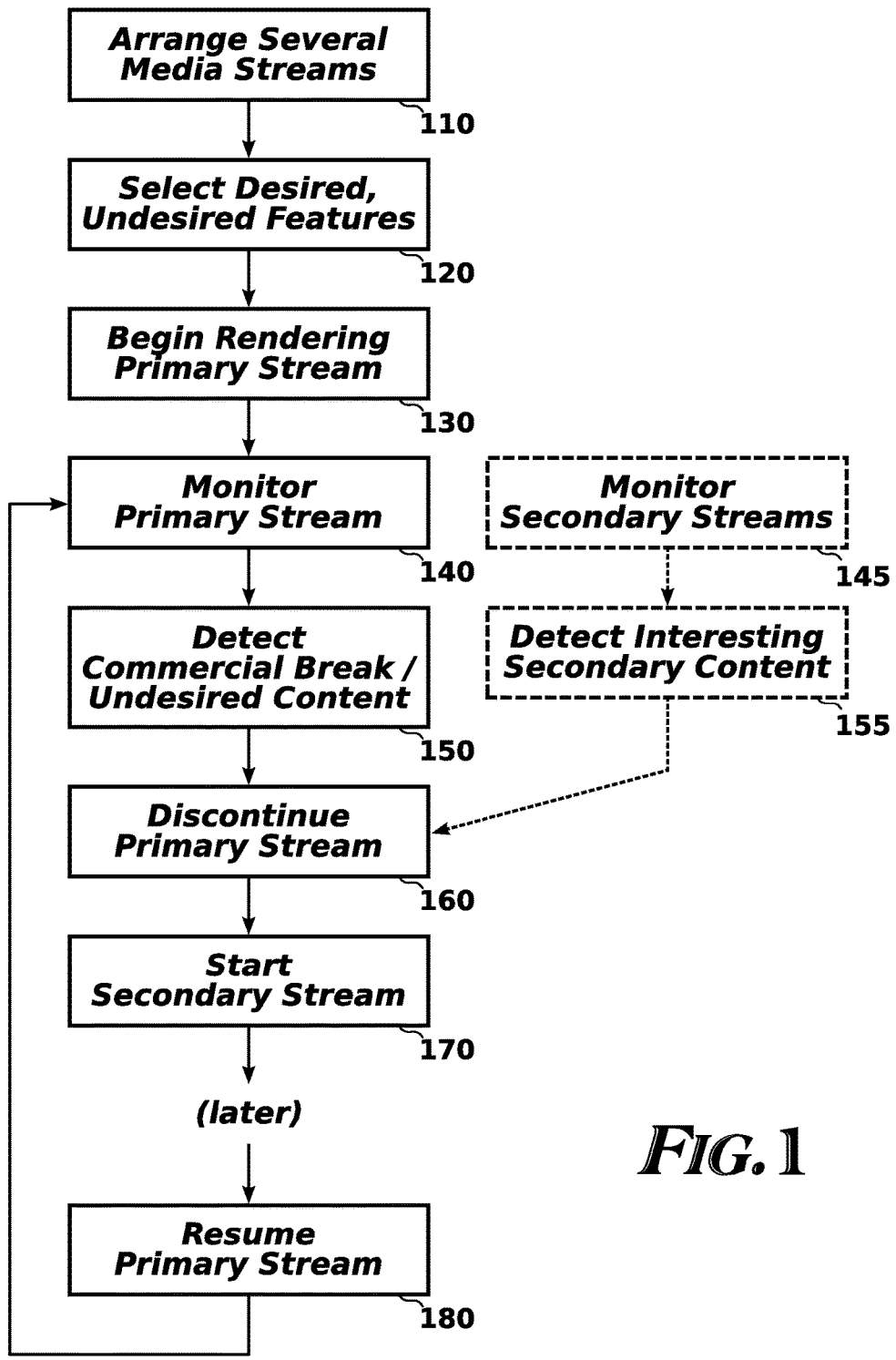
FIG. 1 is a flow chart outlining operations of an embodiment of the invention.

FIG. 1 outlines operations according to an embodiment of the invention. A plurality of media streams is made available (110). Streams may be audio-only (e.g., analog, digital, AM or FM radio, compact disc music, or MP3-encoded music); audio-visual (e.g., television programming or recorded A/V material); and passive or interactive. Some streams are available on demand: they can be started and stopped at any time; while other streams may only be available in real time. Certain streams can be converted to on-demand streams by recording them for later playback.

Desired and/or undesired features of various streams may be selected by the user (optional step 120). For example, the user may specify that certain programs or genres are of particular interest, or that certain material (e.g., programming containing mature themes) is to be avoided. In a preferred embodiment, commercial interruptions in a content stream can be specifically selected to seek out or avoid.

Once the user's preferences are configured, the system begins rendering the content of a primary stream (130). For example, the primary stream may be a radio program, played through an audio system; or a television program, displayed on a monitor. Rendering may include processing, routing or conditioning the stream to enable its output. The primary stream's content is monitored (140) for the occurrence of a signal or indication of a commercial break or material that is to be avoided. In some embodiments, streams other than the primary stream are also monitored (145) for the occurrence of material of interest. Monitoring may be accomplished by a number of different techniques, discussed below.

When a commercial break or undesired segment of the primary stream is detected (150) (or, in some embodiments, where a segment of a secondary stream that is of greater interest than the primary stream occurs, 155), the system discontinues the primary stream (160) and begins to render a secondary stream (170). Monitoring continues while the secondary stream is being played, and the system will switch back to the primary stream (180) when the commercial break is over or when its programming is of greater interest to the user than the secondary stream. In some embodiments, a secondary stream may itself be interrupted by a tertiary stream, and the system may return either to the secondary stream, or directly to the primary stream.

When switching from a primary stream to a secondary stream (or vice versa), an embodiment may perform a brief transition operation to avoid discontinuity. For example, the audio volume of the primary stream may be reduced to a low level, and the volume of the secondary stream may be started at a low level and increased to match the pre-switch volume of the primary stream. Video content may joined by a fade-out, fade-in transition or an alpha blend. (An alpha blend is a transition where a first video signal is modified to become increasingly transparent, while a second video signal is modified from transparent to opaque. The effect switches smoothly from the first video signal to the second video signal.)

When switching away from a multimedia stream at the commercial break or to avoid undesired content, the primary stream will typically not be suspended. However, in some configurations the user may choose to override or engage a further connection to the secondary stream even after a resumption signal has indicated the end of a commercial break. In certain circumstances when switching away from a primary stream to present material on a secondary stream, the secondary stream may be extended beyond a commercial break transition and the primary stream may be buffered, suspended, or even rewound when context switching back to the primary stream to avoid missing a portion of the primary stream after the commercial break ends. Similarly, when a selected secondary stream is discontinued, an embodiment may pause, suspend or rewind the secondary stream so that no portion of the secondary stream is missed.

Figure 2:
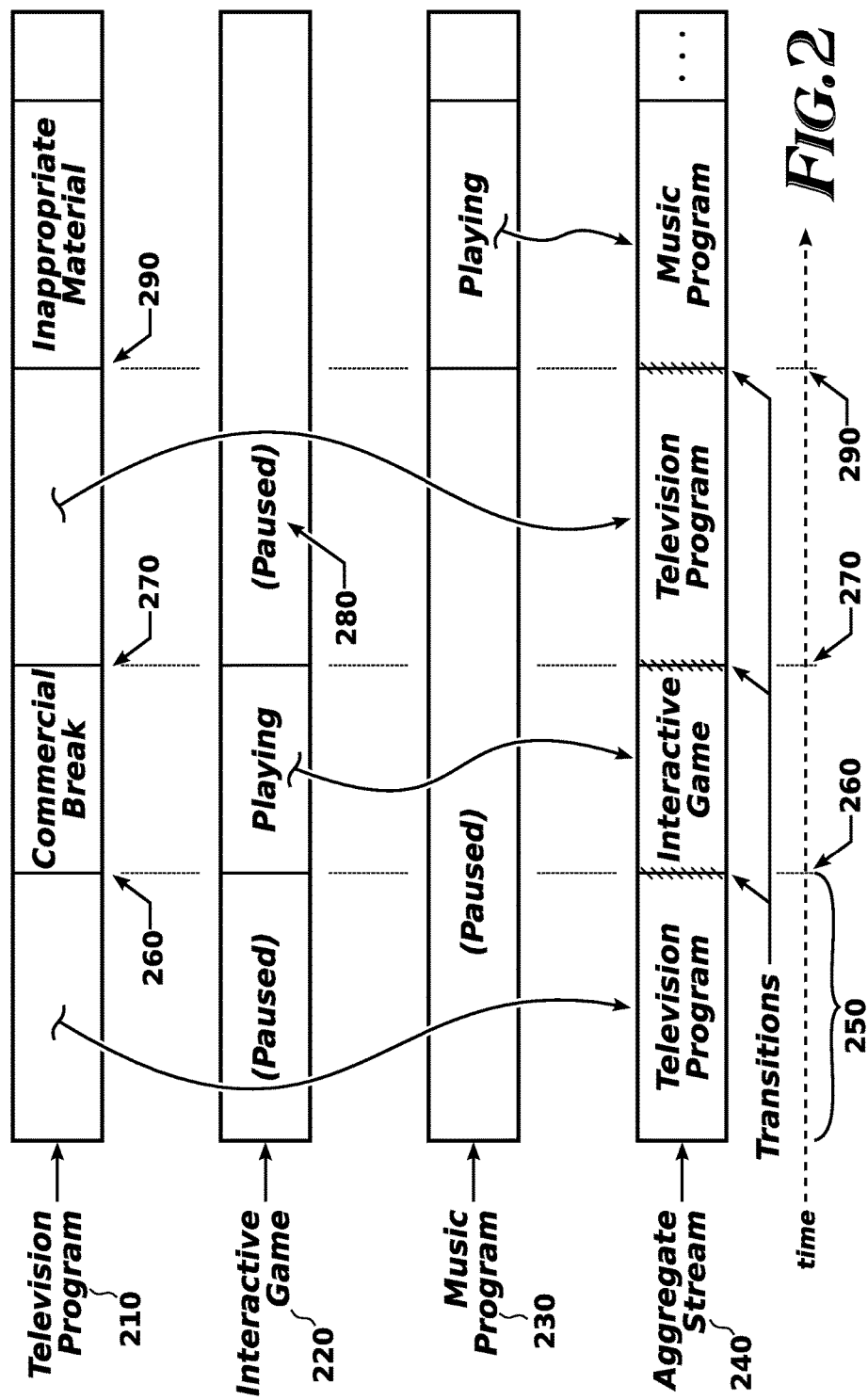
FIG. 2 shows how an embodiment multiplexes multiple content streams to obtain a higher-quality aggregate stream.

FIG. 2 shows how material from three different content streams may be interleaved according to an embodiment of the invention. Stream 210 is an ordinary television broadcast. Stream 220 is an interactive video game. Stream 230 is a music program. Aggregate stream 240 shows the portions of the available content streams that are selected for presentation by an embodiment of the invention. During time period 250, material from television broadcast 210 is displayed. At time 260, a commercial break begins, so the system switches to stream 220. The user plays the interactive game until time 270, when the commercial break terminates. The system pauses the interactive game 280 and resumes output of stream 210. Later, at time 290, content that is inappropriate for minors appears in stream 210, so the system switches to music stream 230.

Figure 3:
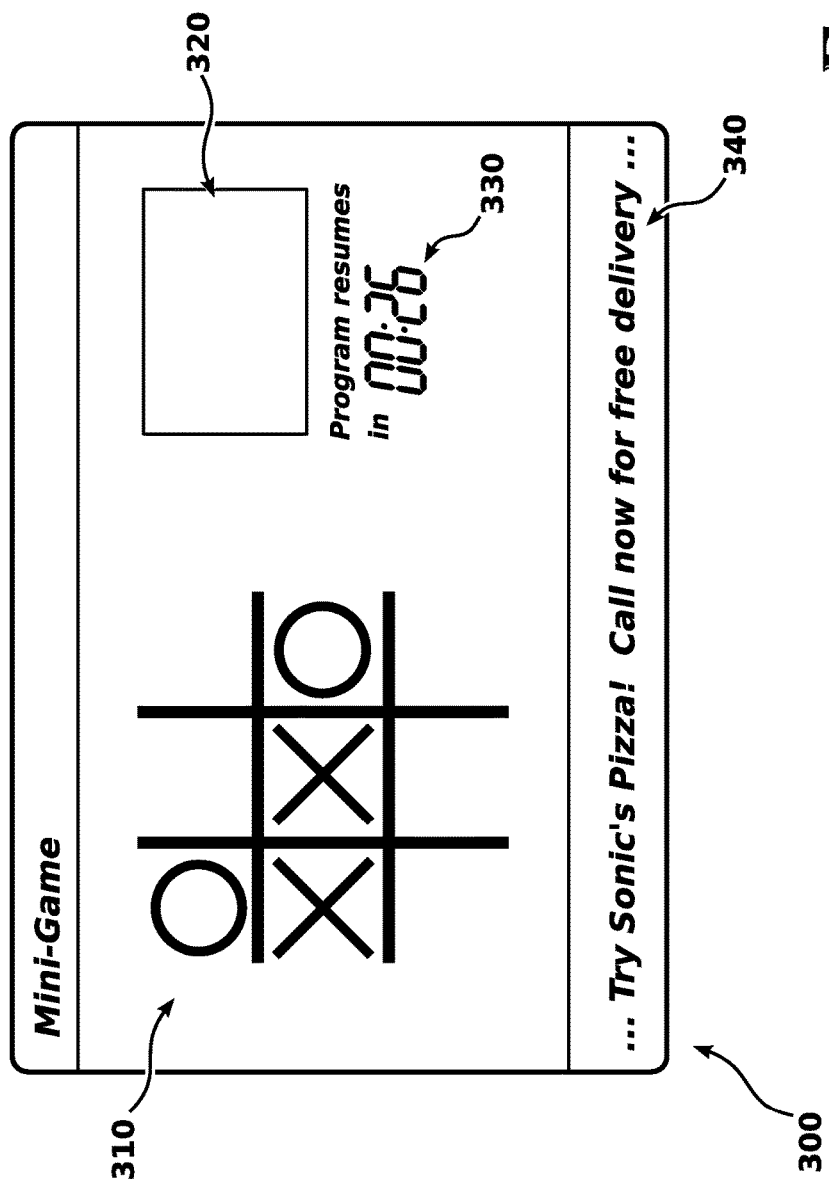
FIG. 3 shows a sample display produced by an embodiment of the invention.

Although the aggregate stream 240 in FIG. 2 indicates that only content from one stream is rendered at any time, in some embodiments, switching from one stream to another may comprise reducing the prominence of the undesired stream and increasing the prominence of the desired stream, while both streams are displayed simultaneously. For example, a variation of the known "picture-in-picture" method can be applied here, as shown in the sample display 300 of FIG. 3. With picture-in-picture, one stream's content is presented over most of a display screen 310, but a small, often rectangular area 320 is used to present the content of a second stream. The size and location of the small, inset screen may be configured by the user and/or altered on the fly. FIG. 3 also shows a time counter 330 to indicate when the media stream being displayed in inset 320 will be restored to the main portion of the screen, and a "crawl" 340 presents data from a low-bandwidth, text-only stream.

In some environments, a user may not be adamantly opposed to viewing commercial content, but may prefer to receive commercials that are relevant to her interests, rather than commercials selected to appeal to a hypothetical viewing audience. In this case, a secondary stream may provide alternate commercials to replace material presented during a commercial break in the primary stream. Content for the secondary stream may be stored locally on a component of the user's multimedia system (i.e., her home entertainment system), or may be delivered via a wired or wireless connection. In one embodiment, a low-bandwidth bandwidth text "crawl" (text that scrolls across a narrow horizontal band on the screen) displays targeted advertising, as shown at 340.

In some environments, a network comprised of consumer electronic devices incorporating the present invention may monetize the present invention by providing alternate commercials to replace material presented in existing commercial breaks in the primary stream. Content for the secondary stream may be stored locally on a component of the user's multimedia system (i.e., her home entertainment system), or may be delivered via wired or wireless connection. The local storage may be refreshed in a variety of ways, including from a network, removable media, BlueRay®, HD-DVD's, memory cards, etc.

Some users may prefer to use the time when undesired content is present on the primary media stream to play an interactive game. Mini-games—small tests of logic and/or dexterity—have proven to be popular with computer gamers, and can be presented for a user's enjoyment while display of a primary media stream is suspended. These games may be augmented with advertising.

In an environment where the duration of undesired content on a media stream is known or can be estimated, the time remaining until the primary stream resumes can be displayed to the user, or some other indication, such as an audio or visual cue or signal, may be used to aid the user or process to smoothly handle or render the transition of context switch. This can make the context switch enjoyable, informative and/or entertaining.

In some multimedia systems that implement an embodiment of the invention, several components (e.g., a display screen, content receiver, audio system and game console) can cooperate to create an improved user experience. For example, the content receiver can obtain information about the media streams it is processing from an Internet database. (Alternative embodiments may extract similar information from the media streams themselves.) The receiver may coordinate stream switching to provide smoother transitions. It may also provide control signals to the audio system and game console to start and stop those streams. A content receiver that includes an analog or digital recording mechanism such as a videotape recorder or a hard disk drive may be able to provide "pause" and "rewind" functionality to improve the user experience.

In some embodiments, a user may influence the automatic selection and stream-switching process. For example, the user might send a signal to a controlling system to cause it to switch media streams even though no desired or undesired program features that would cause an automatic context switch have been detected. Alternatively, the user may reverse an automatic context switch that caused a stream of interest to be discontinued. Even when a context switch is initiated (or canceled) by the user, the system may automatically pause and/or start certain streams. For example, when switching away from an interactive, real-time game due to either an automatic or manual context switch signal, the system may pause the game. The system may also search for appropriate time in the secondary stream to cause a transition from a secondary stream back to a primary stream. The process for switching back to the primary stream may also be orchestrated based on monitoring the secondary stream. For example, instead of cutting out in the middle of a game to switch back to the primary stream after the commercial break in the primary stream is over, the system may start a DVR process and record the primary stream to enable the system to determine an appropriate opportunity to trigger the context switch back to the primary stream. Such opportunities may include black screen cut, end of game level, death of a game character, completion of a game mission, or any metric, including those based on state of a process and reaching a predetermined characteristic. Once the opportunity is determined the system may switch back to the primary stream and rewind to the start of the primary stream after the commercial break ends. In this example, the user would be "viewing" a primary stream under time-delay. Recognizing that the primary stream is no longer "live", the present invention may reference user settings to determine how to handle the next commercial break period. For example, a settings profile may be referenced and user options provided to allow a user to try to catch up to the "live" stream by viewing an alternative set of advertisements during the commercial breaks and where the advertisements are provided in a time-compressed format. For example, instead of watching 2 minutes of live commercial breaks or engaging in a context switch per the present invention, a user who is watching the live program under DVR time-shift delay would have the option to view, say, 15 seconds of banner advertisements during the next commercial break and this would move the user 1 minute 45 seconds closer to the time-base of the live program. Needless to say, it would also provide significant revenue potential to adopters of the present invention who would receive payment for selling the 15 second spots.

When manually or automatically switching away from a stream that contains desirable material, the stream may be paused, but when manually or automatically switching away from a stream that contains neutral or undesirable material, the stream may be permitted to proceed, so that the material will be skipped.

An embodiment can determine what type of material a stream is carrying by a number of different means. Some streams will carry machine-processable data in-band or in a sub-channel. Information about other streams may be obtained from an Internet data service. An embodiment may calculate a "hash" or "fingerprint" of a portion of a media stream and search for the hash in a database. A microphone may capture an impression of the audio content of a program, and software similar to voice recognition software may be used to categorize the audio content.

Figure 4:
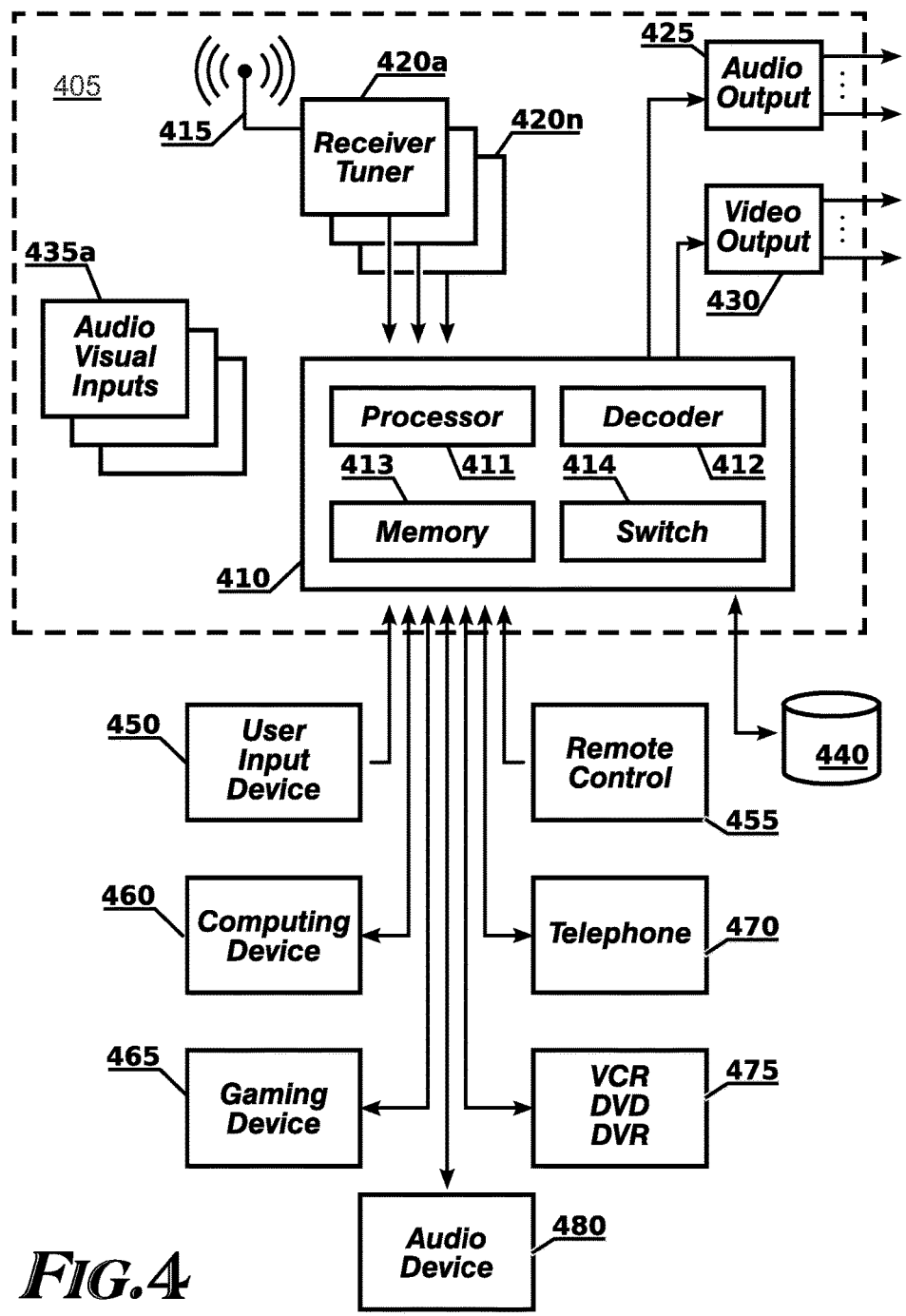
FIG. 4 illustrates an embodiment of an apparatus for carrying out the invention.
Figure 5:
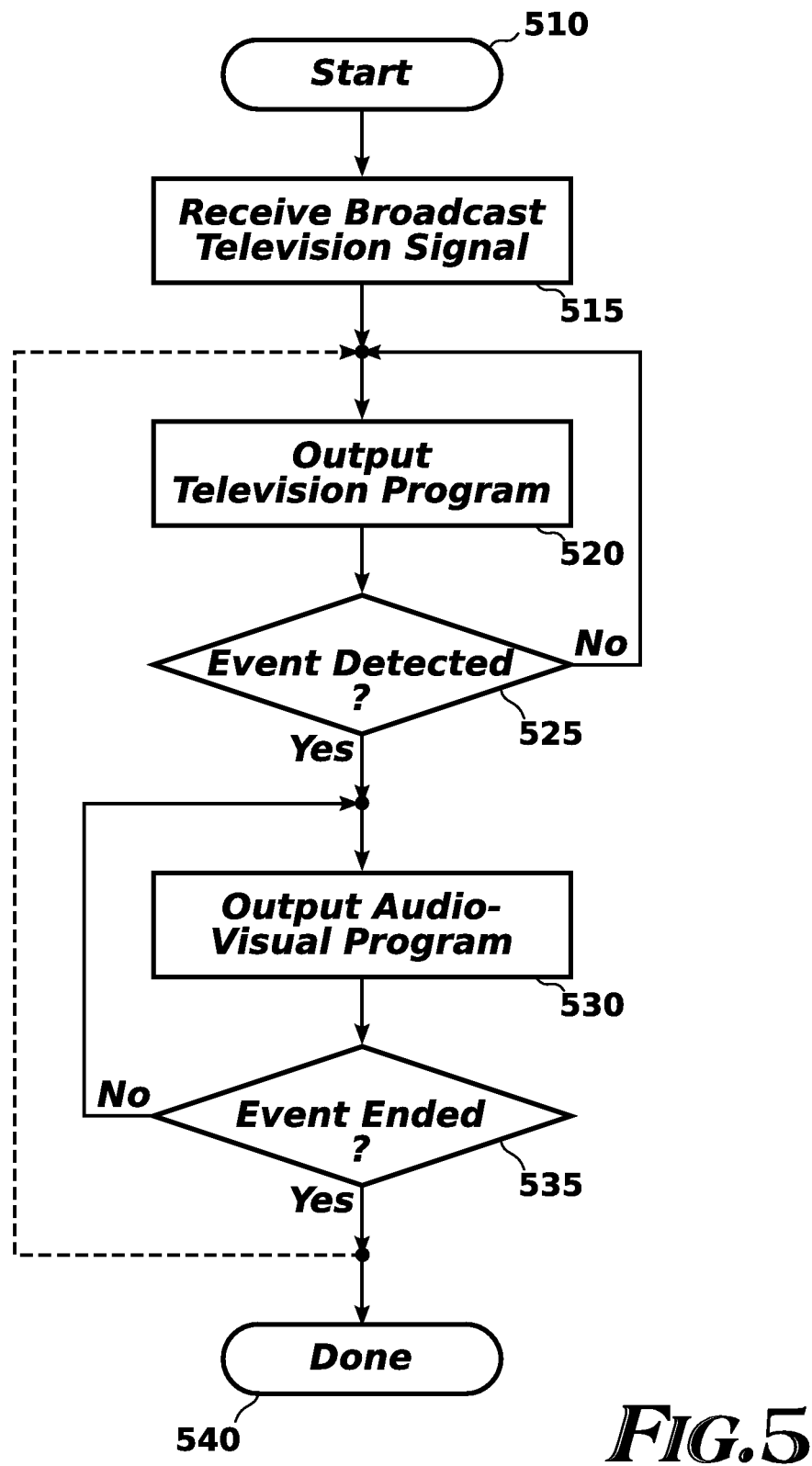
FIG. 5 outlines operations of an embodiment of the invention.

The operation of an audio visual system 400, according to one embodiment of the invention, will now be discussed with reference to FIGS. 4 and 5. At step 510, a television set 405 receives a television signal at an input module. The input module may be a receiver/tuner 420a that receives the television signal via an antenna 415. One or more receiver/tuners 420a-420n provide for receiving a television signal via a wired or wireless transmission facility. Wireless ("over-the-air") signals such as Very High Frequency (VHF) broadcast transmission signals, Ultra High Frequency (UHF) broadcast transmission signals, and direct-to-home satellite transmission signals carry television broadcasts. Television broadcast stations or television networks may transmit a television signal via one of these transmission signals.

Alternatively, the television signal may be received via one of audio visual input modules 435a-435n. As examples, the modules may provide for an Ethernet interface for receiving a television signal over a network such as an intranet or the Internet, a cable set-top box for receiving a television signal via a coaxial cable, a power supply via which to receive a broadband transmission over a power line, or a telephone jack via which to receive Digital Subscriber Line (DSL), ADSL, or xDSL transmission over the wires of a local telephone line. Additionally, the audio visual inputs 435a-435n may include "line-in" jacks to which can be coupled any one of a number of devices that provide television programming, such as a Video Cassette Recorder (VCR), an optical disc storage media player such as a Digital Video Disc (DVD) player, a Digital Video Recorder (DVR), a video game console such as a Sony Playstation™ 3 (PS3), and a computing device such as a personal computer (PC).

Television set 405 includes a control module 410 that receives and processes the television signal from one of the input modules 420a-420n and 435a-435n. Control module 410 includes a processor 411 that executes computer program code maintained in memory 413 that controls the operation of the television set 405, including directing the control module to receive and process a television signal from an input module. The signal may further be decoded at decoder module 412 before being output at step 520 to a display device. For example, the television signal may be received as a compressed digital transmission signal encoded according to Motion Pictures Expert Group-2 ("MPEG-2"), a standard for generic coding of moving pictures and associated audio information. The decoder decompresses and provides the video component and the audio component of the television signal to respective audio output and video output modules 425 and 430. The audio output module includes amplifier circuitry and related circuitry known to those of ordinary skill in the art to convert the audio component of the television signal into sound waves output at 520 by one or more speakers (not shown) coupled to audio output module 425. The video output module 430, in turn, outputs at 520 the video component of the television signal to a monitor or display device (not shown) such as a cathode ray tube (CRT) screen or a liquid crystal display (LCD) screen.

The television signal comprises television programming, for example, a network television situation comedy program. As is well known, television programming is interspersed with "commercial breaks"—advertisments regarding products and services, political advertisements, advertisements regarding upcoming television programming events such as televised sporting events, network news, public service announcements, etc., are transmitted during such commercial breaks. Multiple television programs may be broadcast over a period of time, e.g., one or more hours. A series of one or more television commercials may be "aired" during a commercial break in a particular program or between any two of the multiple television programs.

In one embodiment of the invention, at step 525, the control module monitors the received television signal for an event, such as a commercial break, and at 530 directs the output of an audio visual program that is not part of the received television signal to the display device. The television set receives input from a user, that is, a television viewer, indicating preferences as to the audio visual program to output to the display device upon the occurrence of the event.

The user's preferences may be input via a remote control device 555 or other user input device 450 such as a keyboard, mouse, lightpen, and the like. The user's preferences may be stored in a memory such as memory 413, retreived from memory 413 and provided as input to control module 410 to direct the control module as to the audio visual program to output when a particular event or type of event occurs. Alternatively, the user's preferences may be maintained in a permanent store such as permanent storage medium 440, and fetched from permanent store 440 for caching in memory 413 when needed.

It is appreciated that there are a variety of ways to define and detect an event in the received television signal. One or more techniques such as black screen detection, change in amplitude of the audio signal component of the received television signal, embedded codes in the received television signal, etc., may be employed, and may be known to those of ordinary skill in the art. An event may further be defined within a television program, such as: a scene subject to viewing controls or restrictions, in which case the viewer preference may be that the scene not be displayed at all; a repeated segment of a television program, such as slow motion replay of a controversial or key play in a televised sporting event; scenes from a previous television broadcast of a weekly televised drama; and the opening or closing credits of a television program.

Returning to the discussion of user preferences, a user may indicate a preference for viewing highlights of recent televised sporting events upon the occurrence of a particular event. Upon the occurrence of the event, such as the start of a commercial break in a television program being displayed on the display device, an audio visual program comprising highlights of the recent sporting events is retreived and output to the display device. In one embodiment of the invention, the display of the audio visual program comprising the highlights of the recent sporting events replaces the display of the television commercials that otherwise would be displayed on the display device during the commercial break in the television program.

In an alternative embodiment of the invention, the context switch may not entirely remove the user from experiencing the primary stream. The secondary stream may be occupy the screen along with the primary stream via various display formats. The audio secondary stream program may be displayed as a picture within a picture of the television commercials, or conversely, the television commercials may be displayed as a picture within a picture of the audio visual program. Additional methods of concurrently displaying both the audio visual program and the television commercials are possible, such as displaying either as a reduced size version of itself, such as in a "thumbnail" video picture, in conjunction with the original size version of the other, or displaying each in a separate nonoverlapping window on the display device.

While the example discussed above contemplates outputting another television program that is not part of the received television signal upon detecting, and during at least some portion of, an event associated with the television signal, such as the occurrence of a stream of one or more advertisements in the television signal, it is appreciated that other audio visual program content may be output for display. For example, advertising indicated as being preferred by the user may be displayed instead. Alternatively, the television program that is not part of the received television signal may include its own set of commercials embedded or interspersed with the television program. In one embodiment, the television program and/or commercials that are not part of the received television program may be obtained by control module 410 from a repository, such as permanent storage device 440, and transferred to the display device. In another embodiment, the television program and/or commercials are received from a different television channel.

In another embodiment, the audio visual system 400 may incorporate a number of devices from which an audio visual program may be obtained for display on the display device upon the occurrence of an event in the received television signal. FIG. 4 illustrates exemplary devices including a computing device 460, which may be a desktop personal computer, lap top computer, or personal digital assistant. The computing device may access audio visual program content stored on a permanent storage medium coupled to the computing device, or be able to retreive such from a peripheral device coupled to the computing device, including remote devices within the home, including Windows PC's or other networked DLNA storage or server mediums, a DVD player, or via a server with which the computing device is capable of communicating over a WAN network. As an example, upon the occurrence of an event, and depending on a user's preferences, switch module 414 switches control module 410 to control computing device 460. At that point, a user can interact with computing device 460 via user input device 450, remote control 455, or from a separate user input device associated directly with the computing device. The computing device may transmit an audio visual program, such as an audio visual program from a DVD accessible in a DVD player coupled with the computing device, for display on the display device. In one embodiment, the output from the DVD player is coupled to one of audio visual inputs 435a-435n of television set 405, processed and output to the display device in the same manner as described above with respect to operation of television set 405.

It should be appreciated that detecting an event is not necessarily a binary situation, that is, merely whether the event is detected or not. In one embodiment of the invention, an event can be represented by multiple values, and can trigger the switch module to take one of multiple actions in switching control of the audio visual system, depending on the "value" of the event. Moreover, the user's preferences may vary depending on the "value" of the event, which may also affect the actions to switch control.

Alternatively, the computing device 460 may access and transmit for display on the display device a web site with which the user may interact. For example, the user may interact with the web site while at least some portion of the event occurs in the received television signal. In yet another embodiment, computing device 460 may execute a program that displays a graphical user interface, or a graphical user interface element, such as a free application platform branded as a Yahoo! Widget, on the display device, via which the user may interact with the computing device 460.

Audio visual system 400 may further comprise a video game console 465, such as a Sony PS3. When an event is detected in the received television signal, switch module 414 may switch control to video game console 465, thereby providing the viewer the ability to interact with video game console 465 during the event, or some period of time, in accordance with the user preferences. The audio and video components of a video game being played by the user on the video game console are directed to the audio and video output modules 425 and 430 of television set 405, so that the audio visual program components of the video game are output. In like manner, upon the occurrence of an event, a user may obtain control of the VCR, DVD player, or DVR 475 by way of switch module 414, and see audio visual program content obtained therefrom output to the display device. An embodiment of the invention contemplates other devices, such as telephone 470 or audio device 480 (e.g., an MP3 player or FM radio receiver) being coupled to television set 405 so that audio and/or visual program content obtained therefrom may be forwarded to the television's display device when an event is detected in the received television signal. As with computing device 460, these devices may couple to the television set 405 via one of audio visual inputs 435a-435n.

Regardless of what device provides the audio visual program output directed to the display device upon the detection of an event in the received television signal, at some point the audio visual program output is terminated. For example, in one embodiment of the invention, upon detection of the end of the event at 535, either the output of the audio visual program to the display device terminates, and output of the received television signal to the display device resumes, if previously suspended, or continues, as the case may be, as described above. In the event the audio visual program output at 535 is obtained from one of the devices (460-480) controlled by switch module 414, the switch module stops the transfer of the audio visual program from such device responsive to detection of the end of the event.

In one embodiment of the invention, television set 405 comprises control module 410 which in turn comprises switch module 414 that switches control from television set 405 to other devices in the audio visual system such as video game console 465. However, in another embodiment, any number of devices may include the logic to switch control from one of such devices to another device. For example, it is appreciated that an embodiment of the invention may involve a video game console that receives and displays an audio visual signal on a display device, and upon detection of an event, e.g., the loading of a video game software application, switches control to another device, such as television set 405, while the video game is loading, so that a received television signal from the television set is displayed. Moreover, control may switch between multiple devices depending on the user preferences. For example, the display device may initially display output from a television signal received at television set 405, then control is switched to game console 465 which outputs its audio visual program display to display device, upon the occurrence of an event in the received television signal.

Further, the manner of transitioning control from one device to another may differ depending on the type of device. For example, given the television set primarily provides output to a display device, the transition from the displaying the received television signal from the television set to displaying the audio visual program from another device such as a video game console can be a relatively quick and abrupt. However, the transition from displaying an audio visual program from a video game console, which is an interactive device, may benefit from a relatively slow and considered approach, ensuring that the video game software application is terminated properly, and any user data associated therewith saved for later use.

Figure 6:
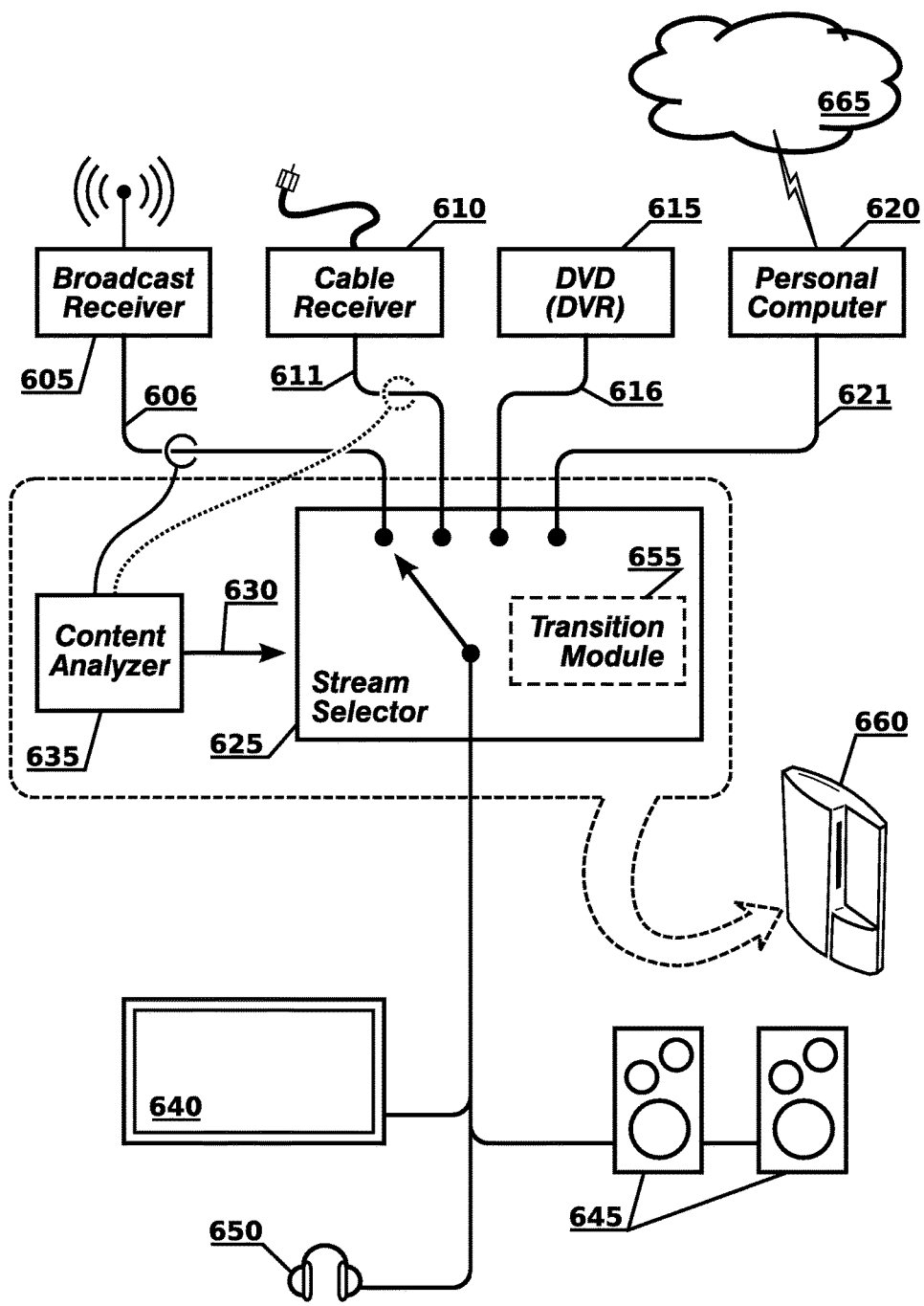
FIG. 6 shows another embodiment of the invention.

FIG. 6 shows a multi-channel media rendering apparatus according to an embodiment of the invention. A plurality of input modules 605, 610, 615, 620 receive or create content streams 606, 611, 616, 621 (respectively). For example, broadcast receiver 605 receives a transmitted television program. Cable receiver 610 receives audio-visual programs transmitted over a wired system. Digital Video Disk ("DVD") player (or Digital Video Recorder, "DVR") 615 plays audio-visual programs stored on machine-readable media. Personal computer 620 may generate audio-visual content (e.g. an interactive computer game) or receive material from a distributed data network 665 such as the Internet and format it as a content stream.

While FIG. 6 shows a plurality of devices which may be used in the present invention it must be understood that the present invention may be configured entirely in a single device. For example, the present invention may be embodied in a small portable FM radio capable of receiving material from the airwaves through an RF input module, capable of storing media i.e. MP3 files, and capable of receiving a signal correlated to the absence or presence of a commercial break for any tuned channel causing output to be rendered by speakers. The radio may be capable of analyzing the currently tuned channel or another channel to determine if a commercial break is occurring for the currently tuned channel. The radio may be capable of receiving a signal that indicates a commercial break is occurring for received channels or index to lookup status for the currently tuned channel. Upon determination of a commercial break event, the FM radio may automatically switch context to play a stored or received audio file from a second input module or alternatively from a second input module that is coupled to another stream including a stream that may be another frequency or channel including an advertising channel that broadcasts alternative commercials.

In one embodiment of the present invention, the various content streams are selected by a selector 625, which selects one of the streams to couple for output according to an automatic selection signal 630. The selection signal 630 may be produced by a number of means and from various services. It may also be produced by an output of a content analyzer 635. The selected stream is delivered to an output module and may be coupled to a High Definition Television ("HDTV") 640, audio speaker system 645, or headphones 650. Note that an "output module" is a device, circuit or process that couples a media stream to an output such as a monitor or speaker, or other sensory output. A stream may be audio-only, so a speaker system 645 or headphones 650 may participate in rendering the stream adequately.

Again, some or all of the elements of this apparatus may be integrated into a single device. For example, a game console 660 may contain hardware and/or software to implement content analyzer 635 and stream selector 625. Game console 660 may accept content streams from external devices, and may also generate a content stream of an interactive computer game, which may be selected by stream selector 625. A transition module 655 may smooth the transition from one stream to another, as discussed previously.

An embodiment of the invention may be a machine-readable medium having stored thereon instructions which cause a programmable processor to perform operations as described above. In other embodiments, the operations might be performed by specific hardware components that contain hardwired logic. Those operations might alternatively be performed by any combination of programmed computer components and custom hardware components.

A machine-readable medium may include any mechanism for storing or transmitting information in a form readable by a machine (e.g., a computer), including but not limited to Compact Disc Read-Only Memory (CD-ROM), Read-Only Memory (ROM), Random Access Memory (RAM), and [Electrically] Erasable Programmable Read-Only Memory ([E]EPROM).

The applications of the present invention have been described largely by reference to specific examples and in terms of particular allocations of functionality to certain hardware and/or software components. However, those of skill in the art will recognize that the present invention may be configured in various contexts. For example, although this example provided was targeting "audio visual" programs the "gist" of the present invention can be suited to audio only systems. For example, a device that is primarily an audio device like a networked iPod® or Zune® may receive an FM broadcast of a primary stream containing commercials. In certain embodiments of the present invention, the content analyzer does not need to be present in an end-user device of the present invention. In these cases, the content analysis function may be done remotely over a network by other devices and the signal output from the content analyzer may be transmitted over a WAN, LAN, wired or wireless it may be carried at or near the spectrum of the transmission and including but not limited to AM or FM broadcast bands, Cellular, Satellite bands, etc. Data output from the content analyzer may be modulated in any fashion so long as the end-user device can be prompted of commercial events and discriminate to determine the commercial break status for a currently tuned channel or for a primary or a reference stream. Content analysis function may broadcast signals for a plurality of channels on a signal or multiple channels, sidebands of channel or channels, etc. The device may detect itself or receive from another device or process a notice of a commercial break then causing it to play a secondary stream during the break then resume back to the program upon notice of resumption event. Again, the secondary stream may be alternative set of advertisements. Such variations and implementations are understood to be captured according to the following claims.

What is claimed is:

1. A multi-channel media rendering apparatus comprising:
   a user input module to receive user input identifying a program, genre, or material of interest to the user, and a program, genre, or material not of interest to the user;
   a first input module to receive a first content stream;
   a second input module to receive a second content stream;
   an output module to emit the first content stream;
   a stream selector to select the second content stream according to a first automatic selection signal, the first automatic selection signal being generated upon detection of a program, genre, or material not of interest to the user in the first content stream;
   the output module to emit the second content stream responsive to selection of the second content stream by the stream selector;
   a content analysis module to analyze the first content stream as received by the first input module while the output module emits the second content stream to detect an end of the program, genre, or material not of interest in the first content stream, and to analyze the second content stream for content switching; and
   a control module to rewind the first content stream to a point after the end of the program, genre, or material not of interest in the first content stream, wherein the output module emits the first content stream from the point under a time-delay responsive to the stream selector selecting the first content stream according to a second automatic selection signal, the second automatic selection signal being generated after detection of the end of the program, genre, or material not of interest in the first content stream and after analyzing the second content stream for content switching.

2. The multi-channel media rendering apparatus of claim 1, wherein the program, genre, or material not of interest in the first content stream includes a commercial break.

3. The multi-channel media rendering apparatus of claim 1, wherein the first content stream is one of an audio stream, or a video stream, or an audio-visual stream.

4. The multi-channel media rendering apparatus of claim 1, wherein the second content stream is one of an audio stream, or a video stream, or an audio-visual stream.

5. The multi-channel media rendering apparatus of claim 1, wherein the second content stream includes an interactive computer game.

6. The multi-channel media rendering apparatus of claim 1,
   wherein the program, genre, or material not of interest in the first content stream is a commercial break,
   wherein the stream selector selects the second content stream responsive to the first automatic selection signal being generated upon detection of the commercial break and detection of a program, genre, or material of interest to the user in the second content stream.

7. The multi-channel media rendering apparatus of claim 5, wherein the opportunity in the second content stream suitable for switching content includes a black screen cut, or an end of game level, or death of a game character, or completion of a game mission, or a metric based on a state of progress in the interactive video game.

8. The multi-channel media rendering apparatus of claim 1, wherein the second content stream includes an advertising component.

9. The multi-channel media rendering apparatus of claim 1, further comprising:
   a stream transition module to compose a transition from the first content stream to the second content stream.

10. The multi-channel media rendering apparatus of claim 9, wherein the transition includes a fade-out of the first content stream and a fade-in of the second content stream.

11. The multi-channel media rendering apparatus of claim 9, wherein the transition includes an alpha blend between the first content stream and the second content stream.

12. The multi-channel media rendering apparatus of claim 1, wherein the output module is an audio reproduction module including at least one loudspeaker.

13. The multi-channel media rendering apparatus of claim 1, wherein the output module is an audio reproduction module including at least one headphone.

14. The multi-channel media rendering apparatus of claim 1, wherein the output module includes an audio-video monitor.

15. The multi-channel media rendering apparatus of claim 1, further comprising:
   an interactive computer game console integrated with the first input module, the second input module and the stream selector,
   wherein the second input module receives as the second content stream a signal from the interactive computer game console executing an interactive computer game.

16. The multi-channel media rendering apparatus of claim 1, further comprising:
   a distributed data network interface to receive the first automatic selection signal from a remote server on a distributed data network.

17. The multi-channel media rendering apparatus of claim 16, wherein the first automatic selection signal is transmitted over the distributed data network according to a Transmission Control Protocol ("TCP").

18. The multi-channel media rendering apparatus of claim 1, further comprising:
   the content analysis module configured to analyze the second content stream, the content analysis module generating the first automatic selection signal upon detection of a program, genre, or material of interest to the user in the analysis.

19. The multi-channel media rendering apparatus of claim 2, wherein the content analysis module detects the commercial break in the first content stream by analyzing a sideband signal of the first content stream.

20. The multi-channel media rendering apparatus of claim 1, wherein the first automatic selection signal actuates a line-in control of the display module.

21. A method in a multi-channel media rendering apparatus, the method comprising:
- receiving, via a user input module, user input identifying a program, genre, or material of interest to the user, and a program, genre, or material not of interest to the user;
- receiving, via a first input module, a first content stream;
- receiving, via a second input module, a second content stream;
- emitting, via an output module, the first content stream;
- selecting, via a stream selector, the second content stream according to a first automatic selection signal, the first automatic selection signal being generated upon detection of a program, genre, or material not of interest to the user in the first content stream;
- configuring the output module to emit the second content stream responsive to selection of the second content stream by the stream selector;
- analyzing the first content stream as received by the first input module while the output module emits the second content stream to detect an end of the program, genre, or material not of interest in the first content stream, and analyzing the second content stream for content switching;
- configuring a control module to rewind the first content stream to a point after the end of the program, genre, or material not of interest in the first content stream, and configuring the output module to emit the first content stream from the point under a time-delay responsive to the stream selector selecting the first content stream according to a second automatic selection signal, the second automatic selection signal being generated after detection of the end of the program, genre, or material not of interest in the first content stream and analyzing the second content stream for content switching.

* * * * *